Patented Oct. 28, 1952

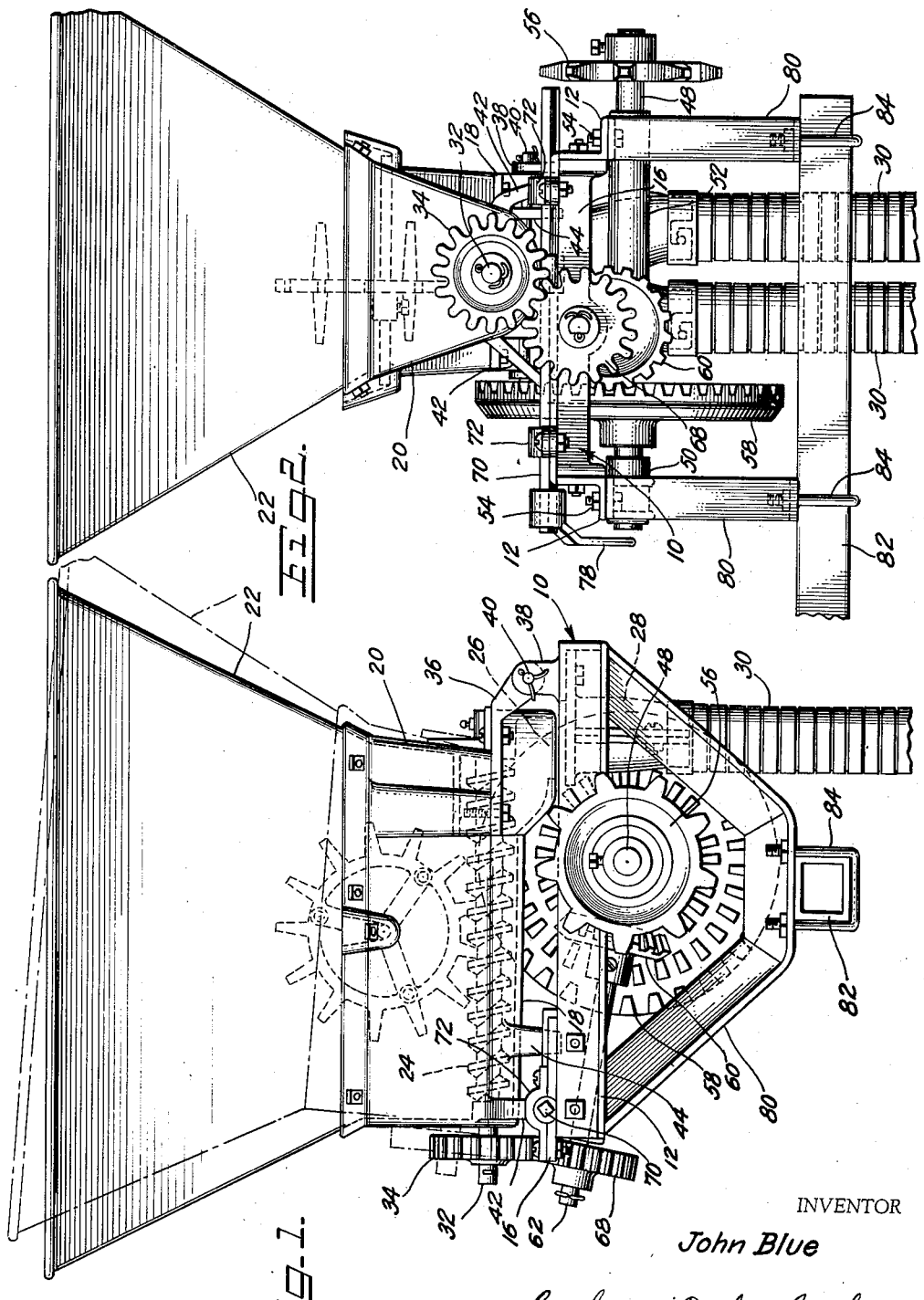

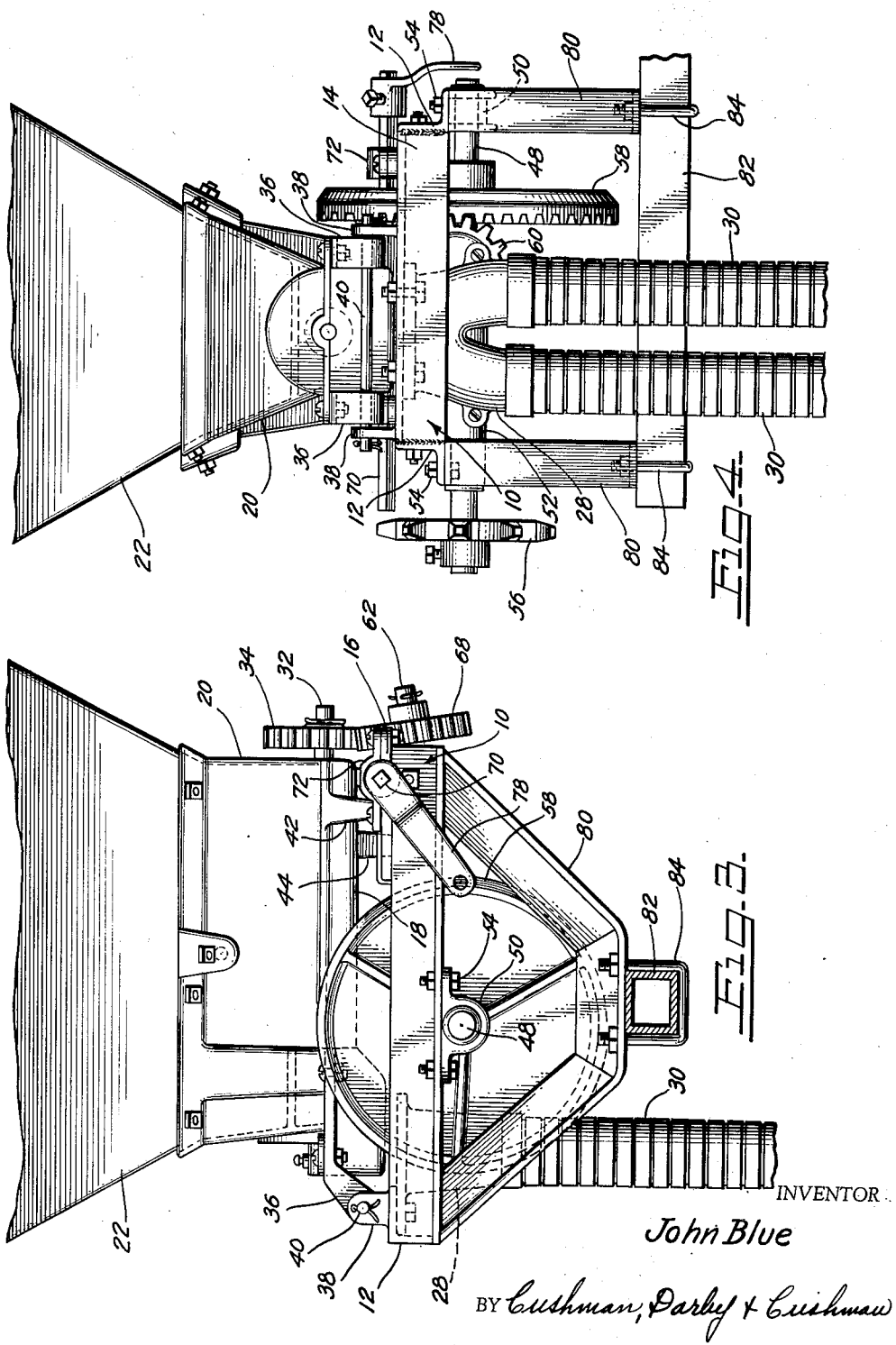

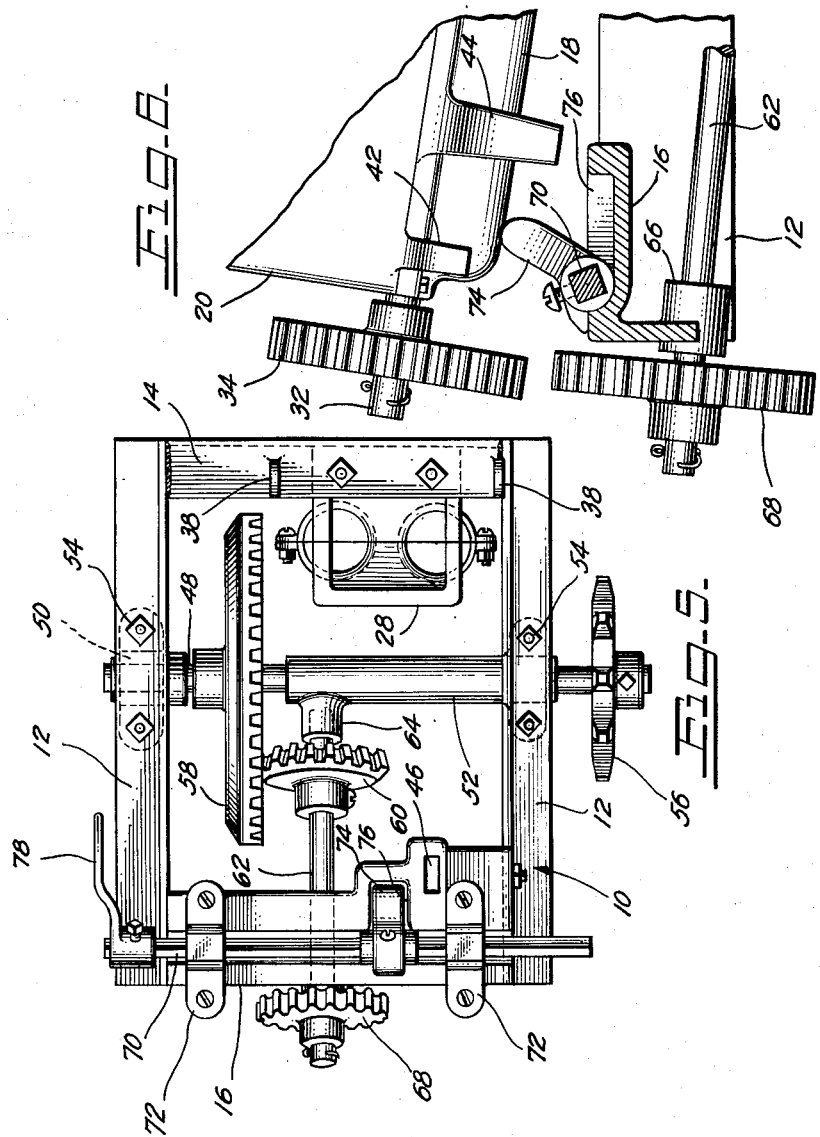

2,615,596

UNITED STATES PATENT OFFICE 2,615,596

FERTILIZER DISTRIBUTOR

John Blue, Huntsville, Ala., assignor to John Blue Company, Huntsville, Ala., a corporation of Alabama Application October 25, 1951, Serial No. 253,043

3 Claims. (Cl. 222—164)

This invention relates generally to agricultural implements and more especially to fertilizer distributors. In particular, this invention pertains to an improvement in the fertilizer distributor disclosed in U. S. Patent No. 2,396,980 to John Blue, March 19, 1946.

The fertilizer distributor shown in the aforementioned patent is adapted to be detachably secured to a tractor having cultivating implements, and, while satisfactory for practical service, is susceptible to various improvements which not only save time and material in its manufacture and shipment, but also facilitate its mounting on a tractor.

It is, therefore, an object of this invention to provide a more compact, and consequently a somewhat lighter, less expensive, and more easily shipped, fertilizer distributor of the type under consideration.

It is another object of this invention to provide a fertilizer distributor of the type under consideration which is more easily mounted on a tractor.

It is still another object of this invention to provide a fertilizer distributor of the type under consideration with improved and simplified means for disengaging the drive for the discharge means thereof.

It is a further object of this invention to provide an improved fertilizer distributor of the type under consideration which effects economies in manufacture, shipment, and installation.

Other objects and advantages of this invention will be evident from the following description and accompanying drawings, in which:

Figure 1 is a side elevational view of a fertilizer distributor embodying this invention.

Figure 2 is an end elevational view taken from the left side of the showing in Figure 1.

Figure 3 is a side elevational view taken from the side opposite to that shown in Figure 1.

Figure 4 is an end elevational view taken from the end opposite to that shown in Figure 2.

Figure 5 is a plan view of the distributor with the hopper removed in order to show details of the driving mechanism.

Figure 6 is a fragmentary vertical sectional view illustrating the mechanism for tilting the hopper to disengage the drive for its discharge conveyor.

The fertilizer distributor is adapted to be mounted on a tractor (not shown) having cultivating implements, one distributor on each side thereof. Since the two distributors are identical in construction, however, except for changes in certain parts to adapt them for left-hand and right-hand operation, a description of one distributor will suffice.

The fertilizer distributor comprises a rectangular supporting frame 10 having longitudinal or side rails 12 joined at one end, as by welding, by a cross rail 14. The side and cross rails 12 and 14 are formed, preferably, of angle iron with the side rails 14 having an upstanding vertical flange and an outwardly facing horizontal flange, and the cross rail an inwardly extending horizontal flange and a depending vertical flange, as shown. To complete the frame 10, the other ends of the side rails 12 are joined by a hopper bed support 16 which is detachably bolted to the side rails 14 and described in greater detail hereinafter.

Supported on the rectangular frame 10 is a fertilizer-containing hopper formed essential in three parts, a conveyor bed 18, a hopper base 20 detachably bolted on the conveyor bed 18, and an upper hopper section 22, preferably detachably bolted to the hopper base 20. Longitudinally journalled within the lower portion of the hopper, as shown in Figure 1, is a screw conveyor 24 for gradually moving fertilizer, or other material to be distributed, toward a discharge opening 26 at one end of the conveyor bed 18, similar to the arrangement shown in U. S. Patent No. 2,242,227 to John Blue, dated May 20, 1941. Directly beneath the discharge opening 26 and bolted to the cross rail 12 is a double discharge spout 28, from which flexible tubes 30 depend to drop the fertilizer immediately to the rear of the cultivating implements on the tractor. At the other end of the hopper a stub shaft 32 of the conveyor 24 projects through the end wall of the hopper and has a spur gear 34 secured thereon. Rotation of this gear 34 serves to turn the conveyor 24 for discharging fertilizer through the flexible discharge tubes 30.

A pair of bosses 36 extend outwardly from the discharge end of the conveyor bed and have openings therein which are aligned with apertures in a pair of upstanding ears 38 on the cross rail 14 of the supporting frame 10. A shaft or pivot pin 40 passing through both the ears 38 and the bosses 36 serves to pivotally mount the hopper on the frame 10 for tilting movement about a substantially horizontal axis. The other end of the hopper is provided with a pair of feet 42, depending from opposite sides of the conveyor bed 18 and normally resting on the upper surface of the hopper bed support 16 to support the hopper in a substantially horizontal position on the frame 10. These feet 42 prevent side sway of the hopper when the tractor is in movement.

It will also be noted that a tooth 44 depends from one side of the conveyor bed 18 into a complementary aperture 46 (Figure 5) formed in the hopper bed support 16 in order to prevent sidewise movements of the hopper.

The drive for the screw conveyor 24 consists of a cross shaft 48 journalled in bearings 50 and 52 which are secured, as by bolts 54, to the underside of each of the side rails 12 of the frame 10. One end of this cross shaft 48 projects outwardly beyond the frame 10 and is provided with a sprocket 56 to be driven by a chain (not shown) running over another sprocket on the main driving axle of the tractor. On the other end of the cross shaft 48, just inwardly on the side rail 12 on the other side of the frame 10, is mounted a multiple gear 58 which meshes with a regulating pinion 60 mounted for longitudinal adjustment upon a longitudinal or pinion shaft 62. The pinion shaft 62 is journalled in a bearing 64 integral with the bearing 52 of the driving shaft 48 and also in another bearing 66 that is integral with the hopper bed support 16, as shown best in Figures 5 and 6. One end of the pinion shaft 62 projects outwardly beyond the hopper bed support 16 and carries a spur gear 68 that normally meshes with the spur gear 34 carried by the conveyor stub shaft 32. Hence, it will be seen that when the tractor is moving the cross shaft 48 will be rotated, thereby turning the pinion shaft 62 and effecting the rotation of the screw conveyor 24. It will be noted that the pinion 60 may be adjusted longitudinally on the pinion shaft 62 for meshing with a different series of teeth on the multiple gear 58 in order to change the gear ratio therebetween and thereby effect changes in the speed of rotation of the screw conveyor 24, with consequent changes in the rate of fertilizer discharge, for a given tractor speed.

In order to disengage the conveyor drive while the tractor is moving, means are provided for tilting the hopper to thereby disengage the normally meshing spur gears 34 and 68. Such means comprises a rock shaft 70 mounted in a longitudinal channel in the upper surface of the hopper bed support 16. The rock shaft 70 has two spaced bushings thereon embodying bearing surfaces which are journalled in complementary surfaces in the channel in the hopper bed support 16 and are held in place by bearing caps 72. Affixed to the rock shaft 70 between the rock shaft bearings is a cam or lift arm 74 (Figures 5 and 6) which projects beneath the conveyor bed 18 and is contained within a complementary depression 76 formed in the upper surface of the hopper bed support 16. It will thus be seen that appropriate rotation of the rock shaft 70 serves to engage the cam 74 with the undersurface of the conveyor bed 18 and to lift or tilt the entire hopper to disengage the spur gears 34 and 68. In order to impart gear-disengaging movement to rock shaft 70, one end thereof is provided with a lateral arm 78 adapted to have a chain (not shown) connected thereto. The other end of the chain is adapted to be connected to the tractor mechanism for lifting the cultivator implements. Hence, distribution of fertilizer may be stopped simultaneously with the lifting of the cultivator implements.

Depending from each of the side rails 12 of the frame 10 is a substantially U-shaped bracket 80 preferably formed of angle iron. These brackets 80 serve to support the fertilizer distributor on a lateral arm 82 adapted to be mounted on the tractor. A clamp bolt or clevis 84 projecting through suitable apertures in the base of the U-shaped bracket 80 serves to detachably secure the fertilizer distributor on the lateral arm 82.

It will thus be seen that the objects of this invention have been fully accomplished. It will be realized, however, that various changes may be made in the specific embodiment used to illustrate this invention, without departing from the principles thereof. Therefore, this invention includes all modifications encompassed by the spirit and scope of the following claims.

I claim:

1. A fertilizer distributor adapted to be mounted on the side of a tractor for drive from an axle thereof comprising: a substantially rectangular frame having side and end rails; a hopper having a base of substantially the same length as said frame, one end of said base being pivotally mounted on one of said frame end rails for upward tilting movement in a substantially vertical plane and the other end of said base being supported on the other of said frame end rails; material discharge means for said hopper, including a shaft projecting from said base other end; operating means for said discharge means including a transverse drive shaft journalled on said frame side rails between their ends and extending beneath said hopper base, a multiple gear carried by said transverse shaft between said side rails and to one side of said hopper base, a pinion gear adjustably meshing with said multiple gear, a longitudinal shaft journalled on said frame beneath said base and carrying said pinion gear, said longitudinal shaft having one end thereof projecting outwardly of said other frame end rail, and a pair of normally-meshed gears, one carried by said projecting end of said longitudinal shaft and the other by said shaft projecting from said hopper base; and means for tilting said hopper to disengage said gear pair.

2. The structure defined in claim 1 in which the tilting means comprises: a transverse rock shaft mounted in a channel in the upper surface of said other frame end rail; and a cam arm on said rock shaft engageable with the undersurface of the hopper base to lift the latter, said other end rail having a recess in said upper surface for receiving said cam arm.

3. The structure defined in claim 1 including a pair of substantially U-shaped brackets, one for each frame side rail and having the ends of the legs thereof secured to the opposite ends of the corresponding side rail and depending therefrom below the multiple gear for mounting the distributor on a single lateral arm on a tractor.

JOHN BLUE.

REFERENCES CITED

The following references are of record in the file of this patent:

UNITED STATES PATENTS

| Number | Name | Date |
| --- | --- | --- |
| 1,864,280 | Scarlett | June 21, 1932 |
| 2,242,227 | Blue | May 20, 1941 |
| 2,311,726 | Blue | Feb. 23, 1943 |
| 2,396,980 | Blue | Mar. 19, 1946 |